(12) United States Patent
Takatsuka et al.

(10) Patent No.: US 10,974,788 B2
(45) Date of Patent: Apr. 13, 2021

(54) BATTERY PACK, BATTERY SYSTEM COMPRISING THE SAME, AND METHOD FOR DISTINGUISHING USE APPLICATION OF BATTERY PACK

(71) Applicant: OMRON CORPORATION, Kyoto (JP)

(72) Inventors: Hiromasa Takatsuka, Tokyo (JP); Junichi Wada, Tokyo (JP); Kazuki Kasai, Tokyo (JP)

(73) Assignee: OMRON Corporation, Kyoto (JP)

( * ) Notice: Subject to any disclaimer, the term of this patent is extended or adjusted under 35 U.S.C. 154(b) by 573 days.

(21) Appl. No.: 15/758,463

(22) PCT Filed: Nov. 2, 2016

(86) PCT No.: PCT/JP2016/082674
§ 371 (c)(1),
(2) Date: Mar. 8, 2018

(87) PCT Pub. No.: WO2017/086171
PCT Pub. Date: May 26, 2017

(65) Prior Publication Data
US 2018/0244343 A1    Aug. 30, 2018

(30) Foreign Application Priority Data

Nov. 17, 2015    (JP) .............................. JP2015-224347

(51) Int. Cl.
*B60R 25/00*    (2013.01)
*B62M 6/90*    (2010.01)
(Continued)

(52) U.S. Cl.
CPC ............ *B62M 6/90* (2013.01); *H01M 10/425* (2013.01); *H01M 10/48* (2013.01); *H02J 7/0031* (2013.01);
(Continued)

(58) Field of Classification Search
CPC ....... B60R 25/40; B60R 25/24; B60R 25/241; B62M 6/90; H02J 7/0063; H02J 7/0031;
(Continued)

(56) References Cited

U.S. PATENT DOCUMENTS 6,150,793 A    11/2000 Lesesky et al.
6,154,006 A    11/2000 Hatanaka et al.
(Continued)

FOREIGN PATENT DOCUMENTS

JP    H10-293874 A    11/1998
JP    2002-291110 A    10/2002
(Continued)

OTHER PUBLICATIONS

The U.S. Office Action dated Oct. 28, 2020 in a related U.S. Appl. No. 15/758,513.
(Continued)

*Primary Examiner* — Huan H Tran
(74) *Attorney, Agent, or Firm* — Metrolex IP Law Group, PLLC (57) ABSTRACT

A battery pack (110) comprises a discharge current acquisition component (11), a status acquisition component (12), a similarity calculator (112), and a use application determination component (113). The discharge current acquisition component (11) acquires the current value of a discharge current supplied to a vehicle (30). The status acquisition component (12) acquires the speed of the vehicle (30) operated by the current value acquired by the discharge current acquisition component (11). The similarity calculator (112) compares the current value acquired by the discharge current acquisition component with the speed of the vehicle (30) acquired by the status acquisition component (12), and calculates the similarity between the two. The use application determination component (113) determines
(Continued)

whether or not the battery pack is being used for something other than its intended use application, according to the similarity calculated by the similarity calculator (112).

17 Claims, 8 Drawing Sheets

(51) Int. Cl.
    *H02J 7/00*     (2006.01)
    *H01M 10/42*     (2006.01)
    *H01M 10/48*     (2006.01)
    *B62J 43/00*     (2020.01)
    *H01M 50/20*     (2021.01)

(52) U.S. Cl.
    CPC ......... *H02J 7/0063* (2013.01); *B60L 2200/12* (2013.01); *B60R 25/00* (2013.01); *B62J 43/00* (2020.02); *B62K 2204/00* (2013.01); *H01M 10/4221* (2013.01); *H01M 10/488* (2013.01); *H01M 50/20* (2021.01); *H01M 2010/4271* (2013.01); *H01M 2010/4278* (2013.01); *H02J 7/00045* (2020.01); *H02J 2007/0067* (2013.01)

(58) Field of Classification Search
    CPC ......... H02J 7/00045; H02J 2007/0067; H01M 10/425; H01M 10/48; H01M 50/20; H01M 2010/4278; H01M 2010/4271; H01M 10/488; H01M 10/4221; B62J 43/00; B60L 2200/12; B62K 2204/00; Y02E 60/10
    See application file for complete search history.

(56) References Cited

U.S. PATENT DOCUMENTS

| | | | |
|---|---|---|---|
| 6,429,622 | B1 | 8/2002 | Svensson |
| 8,652,670 | B2 | 2/2014 | Uchida |
| 9,194,919 | B2 | 11/2015 | Uesaka |
| 2007/0194751 | A1 | 8/2007 | Odaohhara |
| 2011/0089900 | A1 | 4/2011 | Hogari |
| 2011/0127956 | A1 | 6/2011 | Mitsutani |
| 2012/0049786 | A1 | 3/2012 | Kurimoto |
| 2012/0101755 | A1 | 4/2012 | Hirasawa |
| 2012/0116699 | A1 | 5/2012 | Haag et al. |
| 2013/0026972 | A1 | 1/2013 | Luke et al. |
| 2013/0026973 | A1 | 1/2013 | Luke et al. |
| 2013/0149578 | A1 | 6/2013 | Uchida |
| 2014/0089692 | A1 | 3/2014 | Hanafusa |
| 2014/0217935 | A1 | 8/2014 | Matsui et al. |
| 2014/0222358 | A1 | 8/2014 | Morita et al. |
| 2014/0244193 | A1 | 8/2014 | Balasingam et al. |
| 2014/0244225 | A1 | 8/2014 | Balasingam et al. |
| 2014/0361748 | A1 | 12/2014 | Charbiwala et al. |
| 2014/0379188 | A1 | 12/2014 | Uesaka |
| 2015/0180383 | A1 | 6/2015 | Matsumoto |
| 2015/0380716 | A1 | 12/2015 | Zama et al. |
| 2016/0079775 | A1 | 3/2016 | Su |
| 2017/0117587 | A1 | 4/2017 | Sugeno et al. |
| 2017/0126027 | A1* | 5/2017 | Park ................... B60L 3/0046 |
| 2018/0038916 | A1 | 2/2018 | Haag et al. |
| 2018/0205332 | A1 | 7/2018 | Matsumoto |

FOREIGN PATENT DOCUMENTS

| | | | |
|---|---|---|---|
| JP | 2006-92850 | A | 4/2006 |
| JP | 2006-236806 | A | 9/2006 |
| JP | 2007-35479 | A | 2/2007 |
| JP | 2007-194052 | A | 8/2007 |
| JP | 2009-186235 | A | 8/2009 |
| JP | 2011-86469 | A | 4/2011 |
| JP | 2012-125142 | A | 6/2012 |
| JP | 2012-159357 | A | 8/2012 |
| JP | 2012-222945 | A | 11/2012 |
| JP | 2013-25589 | A | 2/2013 |
| JP | 2013-74640 | A | 4/2013 |
| JP | 2014-30320 | A | 2/2014 |
| JP | 2014-54082 | A | 3/2014 |
| JP | 2014-135895 | A | 7/2014 |
| JP | 2014-149280 | A | 8/2014 |
| JP | 2014-169059 | A | 9/2014 |
| JP | 2014-193081 | A | 10/2014 |
| JP | 2015-204149 | A | 11/2015 |
| WO | 2013016570 | A1 | 1/2013 |
| WO | 2017/086166 | A1 | 5/2017 |
| WO | 2017/086167 | A1 | 5/2017 |

OTHER PUBLICATIONS

The Japanese Office Action dated Oct. 29, 2019 in a related Japanese patent application.
The U.S. Office Action dated Jun. 1, 2020 in a related U.S. Appl. No. 15/759,000.
The U.S. Office Action dated Jun. 1, 2020 in a related U.S. Appl. No. 15/758,513.
The Japanese Office Action dated Aug. 20, 2019 in a related Japanese patent application.
The Japanese Office Action dated Jan. 28, 2020 in a related Japanese patent application.
The extended European search report dated Jul. 11, 2019 in a counterpart European patent application.
The Office Action dated Apr. 14, 2020 in a related Japanese patent application.
The Supplementary European Search Report dated May 23, 2019 in a related European patent application.
An English translation of the International Search Report of a related international application PCT/JP2016/082607 dated Dec. 20, 2016.
An English translation of the Written Opinion of a related international application PCT/JP2016/082607 dated Dec. 20, 2016.
An English translation of the International Search Report of a related international application PCT/JP2016/082616 dated Jan. 24, 2017.
An English translation of the Written Opinion of a related international application PCT/JP2016/082616 dated Jan. 24, 2017.
An English translation of the International Search Report of PCT/JP2016/082674 dated Jan. 17, 2017.
An English translation of the Written Opinion of PCT/JP2016/082674 dated Jan. 17, 2017.
The extended European search report (EESR) dated Nov. 29, 2018 in a related European patent application.

\* cited by examiner

BATTERY PACK, BATTERY SYSTEM COMPRISING THE SAME, AND METHOD FOR DISTINGUISHING USE APPLICATION OF BATTERY PACK

FIELD

The present invention relates to a battery pack that supplies power to a power consumption element, a battery system comprising this battery pack, and a method for distinguishing the use application of a battery pack.

BACKGROUND

In recent years, a system has been constructed in which a battery pack installed in a vehicle such as an electric motorcycle or an electric bicycle is used and then exchanged at a battery station where charged battery packs are available.

When a battery pack is thus rented out, there is the risk that it may be used for something other than in a vehicle or other specific power consumption element. If this happens, as a result of using the power of the battery pack for something other than a specific use application, there may be problems, such as a decrease in how accurately the service life of the battery can be predicted, or being unable to ensure the original battery performance (output, capacity, etc.).

For example, Patent Literature 1 discloses a system that permits the functioning of a vehicle according to preset permission information. With this vehicle function permission system, a user who has rented a vehicle can use it within the range of what has been permitted in advance by the owner.

CITATION LIST

Patent Literature

Patent Literature 1: JP-A 2014-169059

SUMMARY

However, the following problems are encountered with the above conventional system.

With the system disclosed in the above publication, although the owner of the vehicle can limit its use to a range of what is permitted, it is not imagined that the battery installed in the vehicle will be used something other than its intended use application.

It is an object of the present invention to provide a battery pack that can detect usage for purposes other than the intended use application, as well as a battery system comprising this battery pack.

The battery pack pertaining to the first invention is a battery pack that supplies power to a power consumption element, comprising a current acquisition component, a status acquisition component, a similarity calculator, and a use application determination component. The current acquisition component acquires the current value of a discharge current supplied to the power consumption element. The status acquisition component acquires the status of the power consumption element operating under the current value acquired by the current acquisition component. The similarity calculator compares the current value acquired by the current acquisition component with the status of the power consumption element acquired by the status acquisition component, and calculates the similarity between the two. The use application determination component determines whether or not the battery pack is being used for its intended use application according to the similarity calculated by the similarity calculator component.

Here, in a battery pack that supplies power to a power consumption element, the current value of the discharge current is compared with the status of the power consumption element, and whether or not the battery pack is being used for its intended use application is detected according to the similarity.

Examples of power consumption elements to which power is supplied from the battery pack of the present invention include vehicles such as electric motorcycles, electric bicycles, electrically assisted bicycles, electric automobiles, and PHVs (plug-in hybrid vehicles), electrical products such as washing machines, vacuum cleaners, and power tools, and various other such electrical products.

Also, the status of the power consumption element acquired by the status acquisition component refers, for example, to the travel speed, motor speed, acceleration, position, and so forth in the case of a vehicle. The status of the power consumption element acquired by the status acquisition component may be acquired indirectly from a sensor provided on the power consumption element side, or may be acquired directly by having the status acquisition component itself function as a sensor.

Furthermore, the similarity calculated by the similarity calculator means whether or not the status of the power consumption element exhibits the same change as the change in the current value upon comparing the change in the current value supplied from the battery pack with the change in the status of the power consumption element operated by that current. That is, whether or not the status of the power consumption element (the speed of vehicle, etc.) is changing according to the change in the current value supplied from the battery pack is calculated by the similarity calculator as the similarity.

More specifically, the similarity calculator confirms whether or not the status of the power consumption element is changing (the speed of vehicle is increasing) as the current value increases when the discharge current from the battery pack rises, for example. The greater is the correlation between the change in the current value and the status change in the power consumption element, the greater the similarity is determined to be.

Consequently, the use application determination component can detect whether or not the battery pack is being used for something other than its intended use application if the similarity calculated by the similarity calculator is above a specific threshold value.

Therefore, if the battery pack is used for something other than its intended use application, this improper usage can be detected, and measures can be taken such as warning the user the battery pack is being used improperly, for something other than its intended use application.

As a result, it is possible to prevent problems such as a decrease in the prediction accuracy of the service life of the battery pack, and an inability to ensure the original battery performance (output, capacity, etc.).

The battery pack pertaining to the second invention is the battery pack pertaining to the first invention, wherein the use application determination component determines that there is an error or the battery pack is being used for something other than its intended use application when the status acquisition component could not acquire the change in the status of the power consumption element.

Here, to deal with a case in which the status acquisition component cannot acquire a status change for the power consumption element, it is determined that there is an error or the battery pack is being used for something other than its intended use application.

Consequently, when the status change acquisition component cannot acquire a status change for the power consumption element, this is detected as improper use, and measures can be taken such as notifying the user with an error display, or warning that the battery pack is being used improperly, for something other than its intended use application.

The battery pack pertaining to the third invention is the battery pack pertaining to the first or second invention, wherein the status acquisition component acquires information that includes at least one of the speed, vibration, motor speed, acceleration, and position of the power consumption element.

Here, the status acquisition component acquires information such as the speed, vibration, motor speed, acceleration, position, etc., of the power consumption element as the status of the power consumption element.

Consequently, when the speed or other such status of the power consumption element rises when the discharge current of the battery pack rises, for example, it can be detected that this use is for the intended use application. On the other hand, when the speed or other such status of the electric power consumption element does not change as the discharge current rises, it can be detected that this use is for something other than the intended use application.

The battery pack pertaining to the fourth invention is the battery pack pertaining to any of the first to third inventions, wherein the similarity calculator calculates the similarity after comparing the change in the current value acquired by the current acquisition component with the change in the speed, vibration, motor speed, acceleration, and position of the power consumption element acquired by the status acquisition component.

Here, similarity is calculated according to whether or not there is a correlation between the change in the discharge current value of the battery pack and the change in the status of the power consumption element (information including the speed, vibration, motor speed, acceleration, and position of the power consumption element) acquired by the status acquisition component.

Consequently, when the speed or other such status of the electric power consumption element rises as the discharge current of the battery pack rises, for example, it is determined that the similarity is high, and it can be detected that this use is for the intended use application. On the other hand, when the speed or other such status of the power consumption element does not change as the discharge current rises, it is determined that the similarity is low, and it can be detected that this use is for something other than the intended use application.

The battery pack pertaining to the fifth invention is the battery pack pertaining to any of the first to fourth inventions, wherein the use application determination component determines that the battery pack is being used for something other than its intended use application when the similarity calculated by the similarity calculator is below a specific threshold.

Here, when the numerical value calculated as the similarity by the similarity calculator is below a specific threshold (the similarity is low), it is determined that the battery pack is being used for something other than its intended use application. That is, when the numerical value calculated as the similarity is at or above a specific threshold (the similarity is high), it is determined that the battery pack is being used for its intended use application.

This makes it easy to detect whether or not the battery pack is being used for its intended use application from the similarity between the change in the discharge current value of the battery pack and the status change of the power consumption element, using a preset threshold as a reference.

The battery pack pertaining to the sixth invention is the battery pack pertaining to any of the first to fifth inventions, further comprising a display component that displays a warning to the user when the use application determination component determines that the battery pack is being used for something other than its intended use application, on the basis of the calculation result by the similarity calculator.

Here, when use for something other than the intended use application is detected, a warning display to the effect that the use is for something other than the intended use application is displayed on the display component provided to the battery pack.

This makes it possible to notify the user of the battery pack that it is being used for something other than its intended use application, and to prompt the user to stop using the battery pack for something other than its intended use application.

The battery pack pertaining to the seventh invention is the battery pack pertaining to any of the first to sixth inventions, further comprising a discharge controller that halts discharge to the power consumption element when the use application determination component determines that the battery pack is being used for something other than the intended use application on the basis of the calculation result by the similarity calculator.

Here, when usage for something other than the intended use application is detected, the discharge controller halts discharge from the battery pack.

Consequently, when the user of the battery pack uses it for something other than its intended use application, the battery pack can be forcibly controlled to stop discharging, which prohibits its use for something other than its intended use application.

The battery pack pertaining to the eighth invention is the battery pack pertaining to any of the first to seventh inventions, wherein the power consumption element is a vehicle, including an electric motorcycle, an electric bicycle, and an electrically assisted bicycle.

Here, a vehicle, including electric motorcycles, electric bicycles, and the like, is used as the power consumption element to which power is supplied from the battery pack.

Consequently, whether or not the battery pack is being used for something other than its intended use application can be detected based on whether or not the vehicle speed, acceleration, position, etc., change in response to a change in the discharge current value of the battery pack.

The battery system pertaining to the ninth invention comprises a battery pack and an information processing device. The battery pack has a current acquisition component and a status acquisition component. The current acquisition component acquires the current value of a discharge current supplied to a power consumption element. The status acquisition component acquires the status of the power consumption element operating under the current value acquired by the current acquisition component. The information processing device has a similarity calculator and a use application determination component. The similarity calculator compares the current value acquired by the current acquisition component with the status of the power consumption element acquired by the status acquisition component, and calculates the similarity between the two. The use application determination component determines whether or not the battery pack is being used for its intended use application according to the similarity calculated by the similarity calculator component.

Here, the information processing device compares the current value of the discharge current with the status of the power consumption element for a battery pack supplying power to the power consumption element, and detects whether or not the battery pack is being used for its intended use application according to this similarity.

Examples of power consumption elements to which power is supplied from the battery pack constituting the battery system of the present invention include electric motorcycles, electric bicycles, electrically assisted bicycles, electric automobiles, and PHVs (plug-in hybrid vehicles), electrical products such as washing machines, vacuum cleaners, and power tools, and various other such electrical products.

The information processing device that is part of this battery system includes, for example, a device installed in a battery station from which battery packs are rented out.

Also, the status of the power consumption element acquired by the status acquisition component refers, for example, to the travel speed, motor speed, acceleration, position, and so forth in the case of a vehicle. The status of the power consumption element acquired by the status acquisition component may be acquired indirectly from a sensor provided on the power consumption element side, or may be acquired directly by having the status acquisition component itself function as a sensor.

Furthermore, the similarity calculated by the similarity calculator means whether or not the status of the power consumption element exhibits the same change as the change in the current value upon comparing the change in the current value supplied from the battery pack with the change in the status of the power consumption element operated by that current. That is, whether or not the status of the power consumption element (the speed of vehicle, etc.) is changing according to the change in the current value supplied from the battery pack is calculated by the similarity calculator as the similarity.

More specifically, the similarity calculator confirms whether or not the status of the power consumption element is changing (the speed of vehicle is increasing) as the current value increases when the discharge current from the battery pack rises, for example. The greater is the correlation between the change in the current value and the status change in the power consumption element, the greater the similarity is determined to be.

Consequently, the use application determination component can detect whether or not the battery pack is being used for something other than its intended use application if the similarity calculated by the similarity calculator is above a specific threshold value.

Therefore, if the battery pack is used for something other than its intended use application, this improper usage can be detected, and measures can be taken such as warning the user the battery pack is being used improperly, for something other than its intended use application.

As a result, it is possible to prevent problems such as a decrease in the prediction accuracy of the service life of the battery pack, and an inability to ensure the original battery performance (output, capacity, etc.).

The battery system pertaining to the tenth invention is the battery system pertaining to the ninth invention, wherein the use application determination component determines that there is an error or the battery pack is being used for something other than its intended use application when the status acquisition component could not acquire a change in the status of the power consumption element.

Here, to deal with a case in which the status acquisition component cannot acquire a status change for the power consumption element, it is determined that there is an error or the battery pack is being used for something other than its intended use application.

Consequently, when the status change acquisition component cannot acquire a status change for the power consumption element, this is detected as improper use, and measures can be taken such as notifying the user with an error display, or warning that the battery pack is being used improperly, for something other than its intended use application.

The battery system pertaining to the eleventh invention is the battery system pertaining to the ninth or tenth invention, wherein the status acquisition component acquires information that includes at least one of the speed, vibration, motor speed, acceleration, and position of the power consumption element.

Here, the status acquisition component acquires information such as the speed, vibration, motor speed, acceleration, position, etc., of the power consumption element as the status of the power consumption element.

Consequently, when the speed or other such status of the power consumption element rises when the discharge current of the battery pack rises, for example, it can be detected that this use is for the intended use application. On the other hand, when the speed or other such status of the electric power consumption element does not change as the discharge current rises, it can be detected that this use is for something other than the intended use application.

The battery system pertaining to the twelfth invention is the battery system pertaining to any of the ninth to eleventh inventions, wherein the similarity calculator calculates the similarity after comparing the change in the current value acquired by the current acquisition component with the change in the speed, vibration, motor speed, acceleration, and position of the power consumption element acquired by the status acquisition component.

Here, similarity is calculated according to whether or not there is a correlation between the change in the discharge current value of the battery pack and the change in the status of the power consumption element (information including the speed, vibration, motor speed, acceleration, and position of the power consumption element) acquired by the status acquisition component.

Consequently, when the speed or other such status of the electric power consumption element rises as the discharge current of the battery pack rises, for example, it is determined that the similarity is high, and it can be detected that this use is for the intended use application. On the other hand, when the speed or other such status of the power consumption element does not change as the discharge current rises, it is determined that the similarity is low, and it can be detected that this use is for something other than the intended use application.

The battery system pertaining to the thirteenth invention is the battery system pertaining to any of the ninth to twelfth inventions, wherein the use application determination component determines that the battery pack is being used for something other than its intended use application when the similarity calculated by the similarity calculator is below a specific threshold.

Here, when the numerical value calculated as the similarity by the similarity calculator is below a specific threshold (the similarity is low), it is determined that the battery pack is being used for something other than its intended use application. That is, when the numerical value calculated as the similarity is at or above a specific threshold (the similarity is high), it is determined that the battery pack is being used for its intended use application.

This makes it easy to detect whether or not the battery pack is being used for its intended use application from the similarity between the change in the discharge current value of the battery pack and the status change of the power consumption element, using a preset threshold as a reference.

The battery system pertaining to the fourteenth invention is the battery system pertaining to any of the ninth to thirteenth inventions, wherein the information processing device further has a display component that displays a warning to the user when the use application determination component detects usage for something other than the intended use application on the basis of the calculation result by the similarity calculator.

Here, when use for something other than the intended use application is detected, a warning display to the effect that the use is for something other than the intended use application is displayed on the display component provided to the battery pack.

This makes it possible to notify the user of the battery pack that it is being used for something other than its intended use application, and to prompt the user to stop using the battery pack for something other than its intended use application.

The battery system pertaining to the fifteenth invention is the battery system pertaining to any of the ninth to fourteenth inventions, further comprising a discharge controller that halts discharge to the power consumption element when the use application determination component detects usage for something other than the intended use application on the basis of the calculation result by the similarity calculator.

Here, when usage for something other than the intended use application is detected, the discharge controller halts discharge from the battery pack.

Consequently, when the user of the battery pack uses it for something other than its intended use application, the battery pack can be forcibly controlled to stop discharging, which prohibits its use for something other than its intended use application.

The battery system pertaining to the sixteenth invention is the battery system pertaining to any of the ninth to fifteenth inventions, wherein the power consumption element is a vehicle, including an electric motorcycle, an electric bicycle, and an electrically assisted bicycle.

Here, a vehicle, including electric motorcycles, electric bicycles, and the like, is used as the power consumption element to which power is supplied from the battery pack.

Consequently, whether or not the battery pack is being used for something other than its intended use application can be detected based on whether or not the vehicle speed, acceleration, position, etc., change in response to a change in the discharge current value of the battery pack.

The method for distinguishing the use application of a battery pack pertaining to the seventeenth invention comprises a current acquisition step, a status acquisition step, a similarity calculation step, and a use application determination step. The current acquisition step involves acquiring the current value of a discharge current supplied to the power consumption element. The status acquisition step involves acquiring the status of the power consumption element operating under the current value acquired in the current acquisition step. The similarity calculation step involves comparing the current value acquired in the current acquisition step with the status of the power consumption element acquired in the status acquisition step, and calculating the similarity between the two. The use application determination step involves determining whether or not the battery pack is being used for the intended use application according to the similarity calculated in the similarity calculation step.

Here, in order to distinguish the use application of a battery pack that supplies power to a power consumption element, the current value of the discharge current is compared with the status of the power consumption element, and it is detected whether or not the battery pack is being used for its intended use application according to this similarity.

Examples of power consumption elements to which power is supplied from the battery pack of the present invention include electric motorcycles, electric bicycles, electrically assisted bicycles, electric automobiles, and PHVs (plug-in hybrid vehicles), electrical products such as washing machines, vacuum cleaners, and power tools, and various other such electrical products.

Also, the status of the power consumption element acquired by the status acquisition component refers, for example, to the travel speed, motor speed, acceleration, position, and so forth in the case of a vehicle.

Furthermore, the similarity calculated by the similarity calculator means whether or not the status of the power consumption element exhibits the same change as the change in the current value upon comparing the change in the current value supplied from the battery pack with the change in the status of the power consumption element operated by that current. That is, in the similarity calculation step, whether or not the status of the power consumption element (the speed of vehicle, etc.) is changing according to the change in the current value supplied from the battery pack is calculated as the similarity.

More specifically, in the similarity calculation step, it is confirmed whether or not the status of the power consumption element is changing (the speed of vehicle is increasing) as the current value increases when the discharge current from the battery pack rises, for example. The greater is the correlation between the change in the current value and the status change in the power consumption element, the greater the similarity is determined to be.

Consequently, in the use application determination step, it can be detected whether or not the battery pack is being used for something other than its intended use application if the similarity calculated by the similarity calculator is above a specific threshold value.

Therefore, if the battery pack is used for something other than its intended use application, this improper usage can be detected, and measures can be taken such as warning the user the battery pack is being used improperly, for something other than its intended use application.

As a result, it is possible to prevent problems such as a decrease in the prediction accuracy of the service life of the battery pack, and an inability to ensure the original battery performance.

Effects

With the battery pack of the present invention, it is possible to detect use for something other than the intended use application.

DETAILED DESCRIPTION

Embodiment 1

A battery pack 10 according to an embodiment of the present invention and a battery system 1 comprising the battery pack 10 will be described through reference to FIGS. 1 to 7.

With the battery system 1 in this embodiment, a case in which the intended use application of the battery pack 10 is to supply power to a vehicle 30 will be described as an example.

Configuration of Battery System 1

Figure 1:
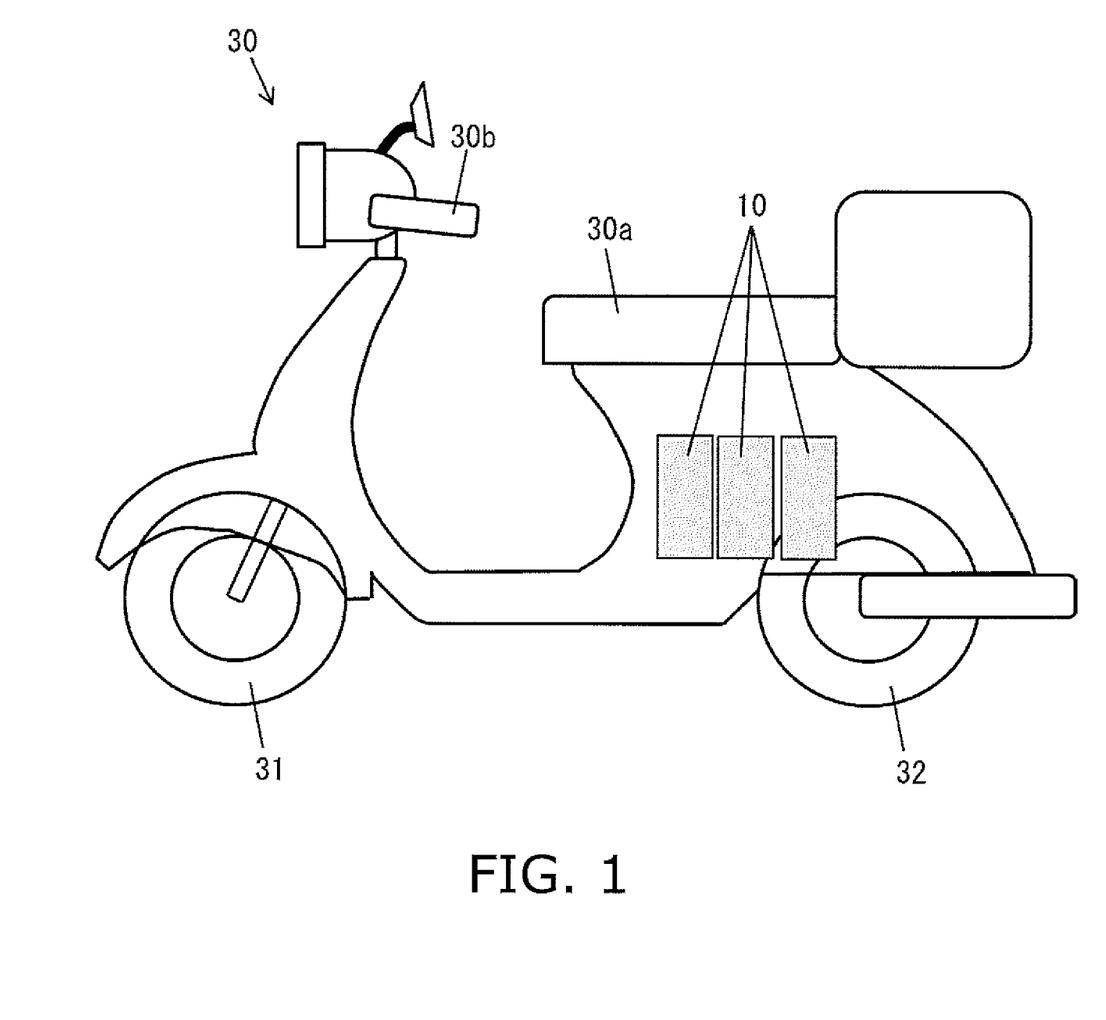
FIG. 1 is a diagram of the state when a battery pack pertaining to an embodiment of the present invention is installed in a vehicle.

As shown in FIG. 1, the battery system 1 according to this embodiment comprises battery packs 10 that supply power to the vehicle 30, such as an electric motorcycle, that is propelled by the drive force of a motor driven by electricity, and an information processing device 20 (see FIG. 2) installed in a battery station or the like where the battery packs are charged.

Three battery packs 10 are installed in the vehicle 30 in a state that allows them to be replaced. The battery packs 10 are repeatedly used by being charged with a designated charger installed in a specific charging station or the like.

Figure 2:
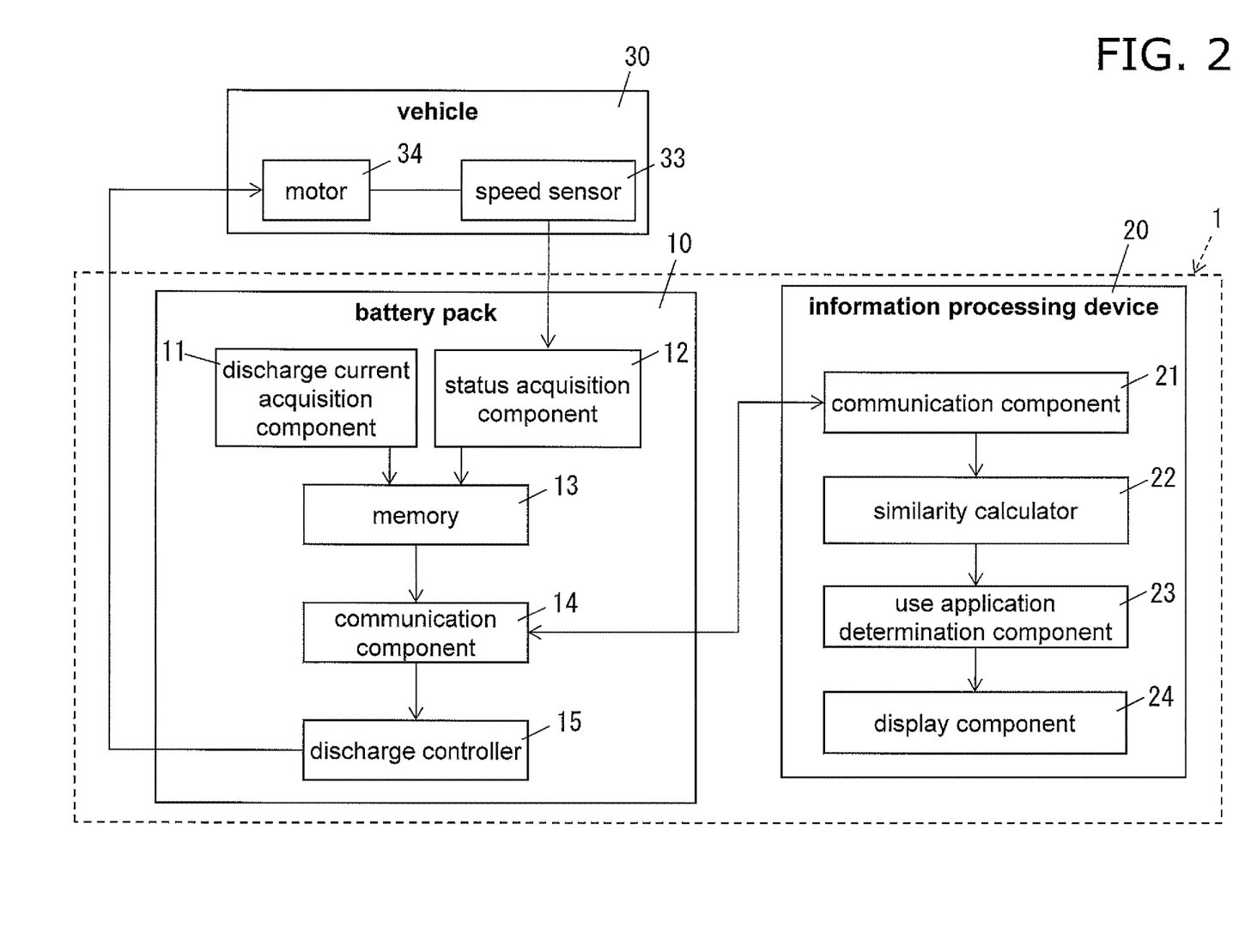
FIG. 2 is a block diagram of the configuration of a battery system including the battery pack in FIG. 1.

The vehicle 30 is an electric motorcycle that is propelled when supplied with power from the three battery packs 10 installed under a seat 30a, and comprises a front wheel 31, a rear wheel (drive wheel) 32, a speed sensor 33 (see FIG. 2), and a motor 34 (see FIG. 2).

The front wheel 31 is a steered wheel provided between the front part of the vehicle 30 and the road surface, and the travel direction can be varied by changing the orientation in conjunction with the orientation of a handle bar 30b.

The rear wheel 32 is a drive wheel provided between the rear part of the vehicle 30 in which the battery pack 10 is installed and the road surface, and is rotationally driven by the motor 34.

The speed sensor 33 is provided to the vehicle 30 to detect the travel speed of the vehicle 30. The speed sensor 33 transmits information related to the detected travel speed of the vehicle 30 to a status acquisition component 12 of the battery pack 10.

The motor 34 is a drive source for rotationally driving the rear wheel 32 of the vehicle 30, and its drive is controlled by the power supplied from the battery packs 10.

Configuration of Battery Pack 10

As shown in FIG. 2, the battery pack 10 in this embodiment comprises a discharge current acquisition component (current acquisition component) 11, the status acquisition component 12, a memory (storage component) 13, a communication component 14, and a discharge controller 15.

Here, use of the battery pack 10 in this embodiment for something other than its intended use application refers, for example, to its use in something other than the vehicle 30, such as when the power of the battery pack 10 is supplied to some other electrical product.

The discharge current acquisition component 11 detects the discharge current supplied from the battery packs 10 to the vehicle 30.

The status acquisition component 12 acquires information related to the travel speed of the vehicle 30 from the speed sensor 33 of the vehicle 30 as the status of the power consumption element. That is, in this embodiment, the travel speed of the vehicle 30 is acquired as a parameter that changes according to changes in the current value supplied from the battery packs 10.

The status acquisition component 12 may be installed inside the battery pack 10 as in this embodiment, or it may be installed on the vehicle 30 side, which is the power consumption element.

Instead of the travel speed of the vehicle 30, the rotational speed of the motor 34, which closely correlates to the travel speed of the vehicle 30, may be acquired.

The memory (storage component) 13 stores the discharge current value acquired by the discharge current acquisition component 11 and information related to the travel speed of the vehicle 30 acquired by the status acquisition component 12, in association with each other. That is, information indicating how the travel speed of the vehicle 30 changes when there is a change in the discharge current is stored in the memory 13.

The communication component 14 is able to communicate with a communication component 21 on the information processing device 20 side, transmits the information stored in the memory 13 to the information processing device 20, and receives the determination result by the use application determination component 23 from the information processing device 20 side.

The discharge controller 15 controls whether or not to halt the supply of power from the battery packs 10 on the basis on the determination result by the use application determination component 23 received from the information processing device 20 side via the communication component 14.

Configuration of Information Processing Device 20

As shown in FIG. 2, the battery system 1 in this embodiment comprises the information processing device 20 that communicates with the battery packs 10.

As shown in FIG. 2, the information processing device 20 has the communication component 21, a similarity calculator 22, the use application determination component 23, and a display component 24.

As discussed above, the communication component 21 communicates with the communication component 14 on the battery pack 10 side, sharing the information stored in the memory 13 on the battery pack 10 side, the determination result by the use application determination component 23 on the information processing device 20 side, and so forth.

The similarity calculator 22 compares the change in the discharge current value acquired by the discharge current acquisition component 11 and received from the battery packs 10 through the communication component 21, with the change in the travel speed of the vehicle 30 acquired by the status acquisition component 12, and calculates the degree of similarity (coincidence) between them.

Here, the status of the vehicle 30 driven by the current discharged from the battery packs 10 is acquired as it is related to the amount of current (output). For example, if the power consumption element is the vehicle 30 or another such moving object, the power consumption of the motor 34 is the predominant factor, and ideally the relation between the torque/speed of the motor 34 and the input current/voltage from the battery packs 10 is expressed by Equation 1.

$$P = V \times I = T \times N \quad (1)$$

(Where V is voltage, I is current, T is torque, N is the motor speed)

Figure 3:
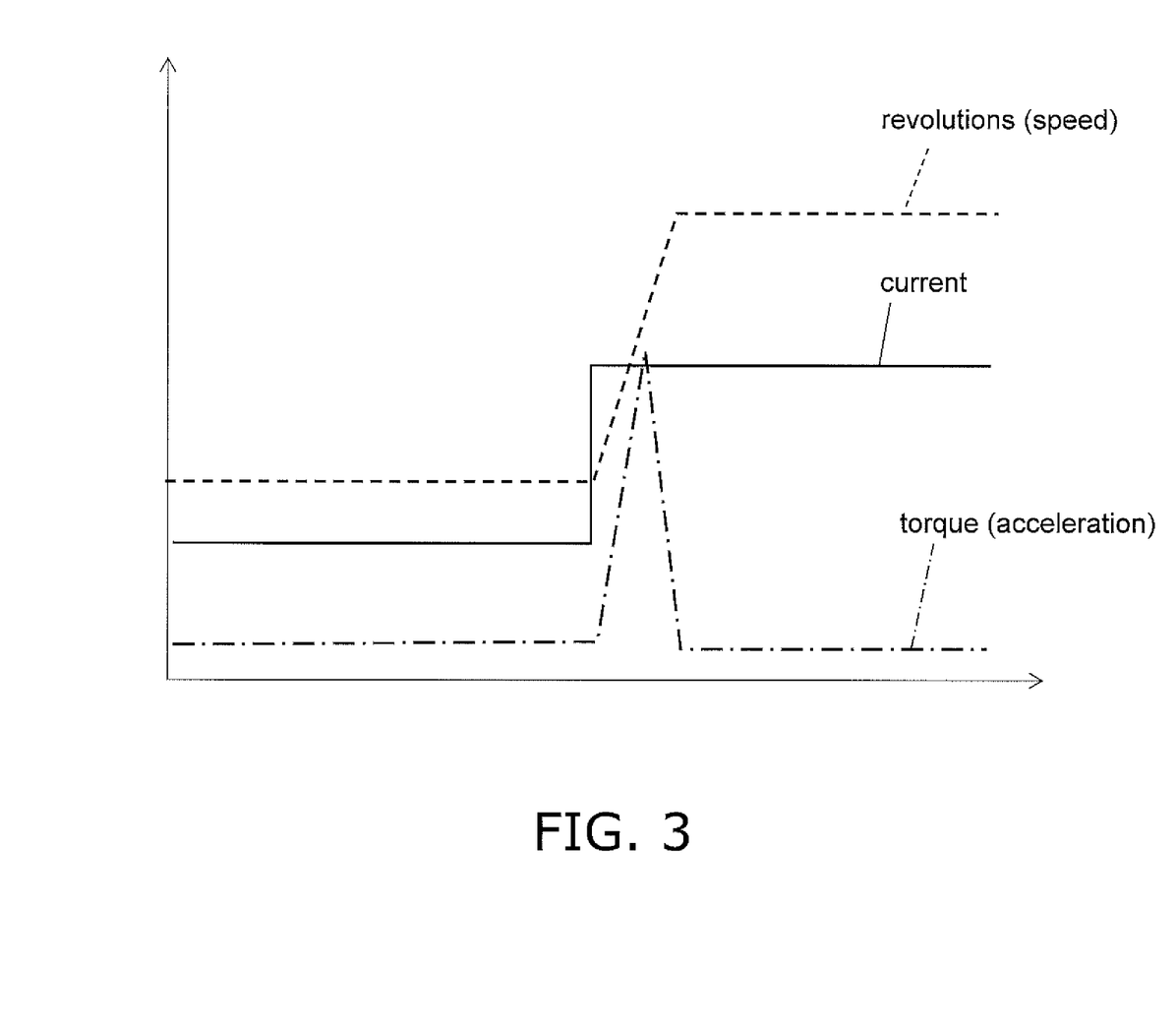
FIG. 3 is a graph of the correlation between a change in the discharge current of the battery pack in FIG. 1, a change in the motor speed of the vehicle, and a change in the torque (acceleration)

Usually, the voltage supplied from the battery packs 10 is constant, so when the amount of current supplied increases, there is a rise in torque (acceleration), as shown in FIG. 3. At a constant torque (travel speed), when the discharge current value goes up, so does the speed of the motor 34 (travel speed), so the discharge current value can be regarded as a relationship as being proportional to the speed of the motor 34 (travel speed).

That is, if power is being supplied to the vehicle 30, which is the intended use application of the battery packs 10, then the speed of the motor 34, which is proportional to the discharge current value, will vary according to the change in the discharge current value of the battery packs 10.

Figure 4:
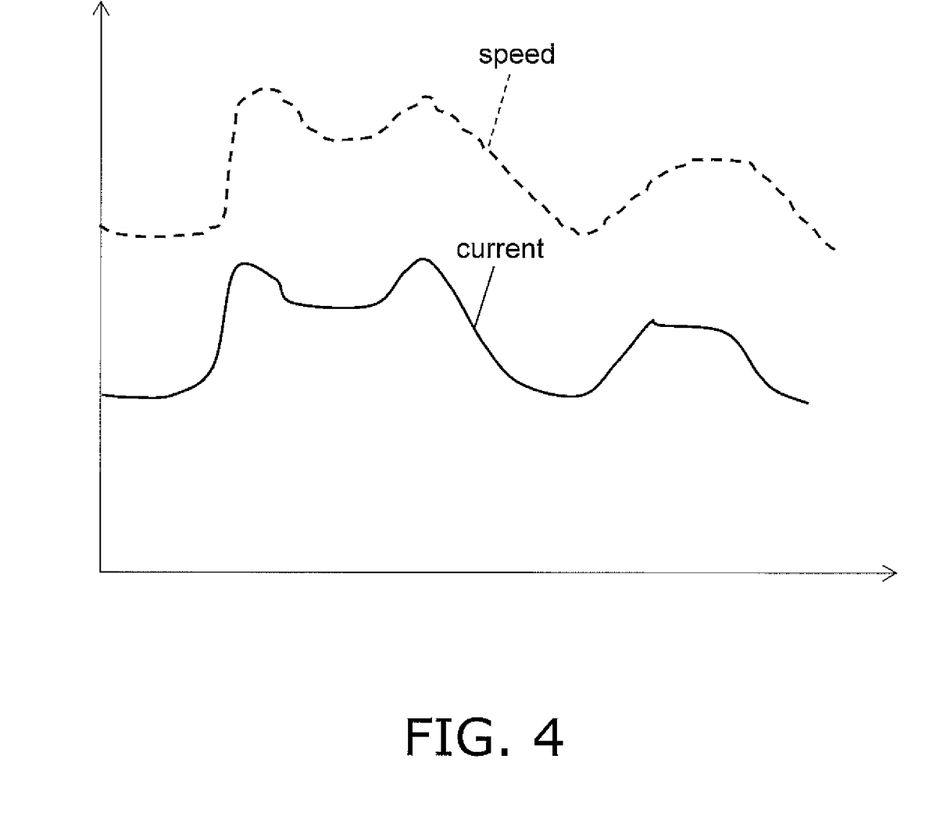
FIG. 4 is a graph of the correlation between a change in the discharge current of the battery pack in FIG. 1 and a change in the motor speed of the vehicle.
Figure 5:
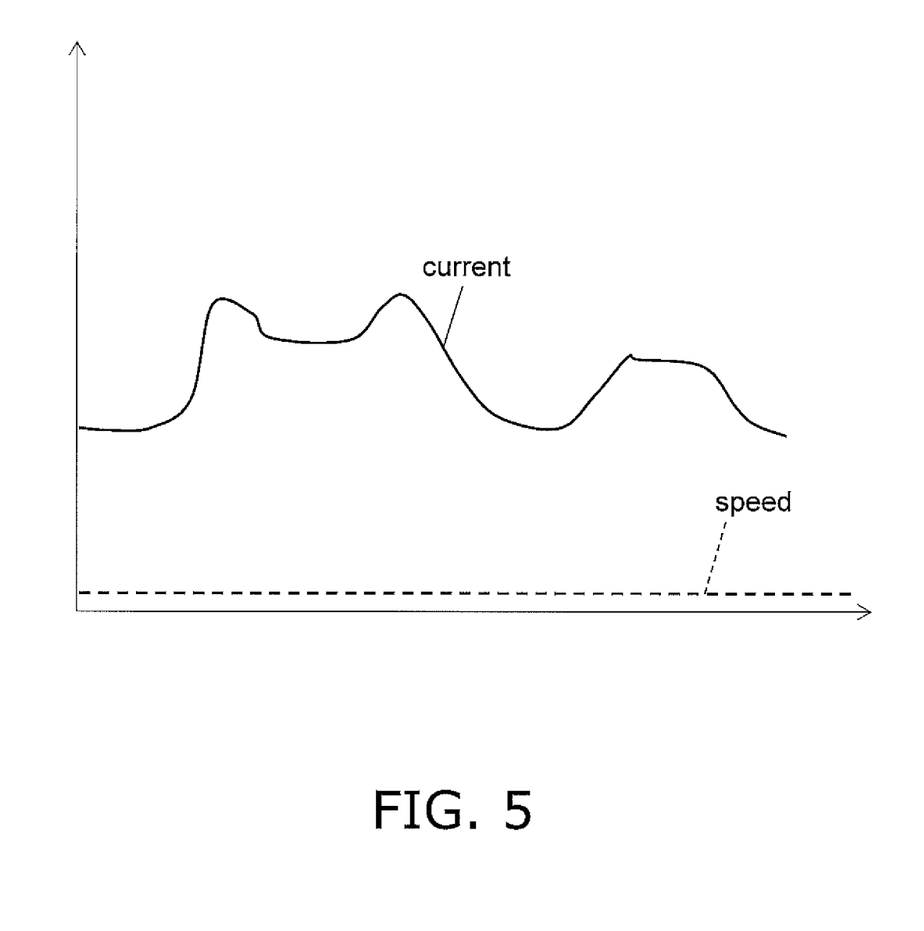
FIG. 5 is a graph of the correlation between a change in the discharge current of the battery pack in FIG. 1 and a change in the speed of a power consumption element that is not the intended use application.

FIG. 4 is a graph of the relation between current and speed when the power outputted from the battery packs 10 is used by the vehicle 30. FIG. 5, meanwhile, is a graph of the relation between current and speed when the power outputted from the battery packs 10 is used for something other than the intended use application (other than the battery pack 10) (such as a home appliance).

That is, when the battery packs 10 are supplying power to the vehicle 30, which is the intended use application, as shown in FIG. 4, the result is a graph in which the current value of the discharge current and the speed of the vehicle 30 exhibit substantially the same change. Consequently, when the battery packs 10 are used for the vehicle 30, which is the intended use application, a high correlation is seen between a change in the current value of the discharge current and a change in the speed of the vehicle 30.

On the other hand, when the battery packs 10 are supplying power to a something other than the intended use application, such as a home appliance, as shown in FIG. 5, the travel speed acquired by the status acquisition component 12 will of course be "0." Therefore, even if the change in the current value of the discharge current varies, the speed of the power consumption element (a home appliance, etc.) will not vary corresponding to this change in the current value. Consequently, as shown in FIG. 5, no correlation is seen between a change in the current value of the discharge current and a change in speed of the power consumption element that is something other than the intended use application (a household appliance, etc.).

Thus, in this embodiment, the determination by the use application determination component 23 is made depending on whether or not the change in the discharge current value of the battery packs 10 and the change in the status of the power consumption element (travel speed of the vehicle 30, etc.) are similar changes.

An example of a method for calculating the similarity indicating the correlation between the change in the current value of the discharge current and the change in the status of the power consumption element (speed change, etc.) is a method of calculating by using a correlation function.

When a correlation function is calculated after normalization, in the case of power supply to the intended use application shown in FIG. 4 (the vehicle 30), a correlation value close to 1 is taken when the error is in the vicinity of zero. On the other hand, in the case of power supply to something other than the intended use application as shown in FIG. 5 (a home appliance, etc.) the correlation value is of course lower.

The use application determination component 23 determines whether or not the battery packs 10 are being used for their intended use application by comparing the value of the similarity calculated by the similarity calculator 22 as described above, with a specific threshold value.

More specifically, the use application determination component 23 compares the numerical value of the similarity calculated by the similarity calculator 22 with a specific threshold value. Then, if the numerical value of the calculated similarity is greater than the specific threshold value, this means that the change in the current value of the discharge current of the battery packs 10 is correlated to the change in the status of the power consumption element, so this use is determined to be for something other than the intended use application.

On the other hand, if the numerical value of the calculated similarity is at or under the specific threshold value, this means that there is a low correlation between a change in the current value of the discharge current of the battery packs 10 and a change in the status of the power consumption element, so this use is determined to be for something other than the intended use application.

Furthermore, the use application determination component 23 makes its determination by acquiring the change in status of the power consumption element acquired by the status acquisition component 12, but it is also conceivable that the speed or other such information cannot be acquired by the status acquisition component 12 during use for something other than the intended use application. Therefore, the use application determination component 23 may also determine that the battery pack is being used for something other than its intended use application when the desired status of the power consumption element thus cannot be acquired by the status acquisition component 12.

When the display component 24 receives the determination result by the use application determination component 23 and it has been detected that the battery pack is being used for something other than its intended use application, a warning to the effect that this use is not the intended use application is displayed for the user of the battery packs 10.

Figure 6:
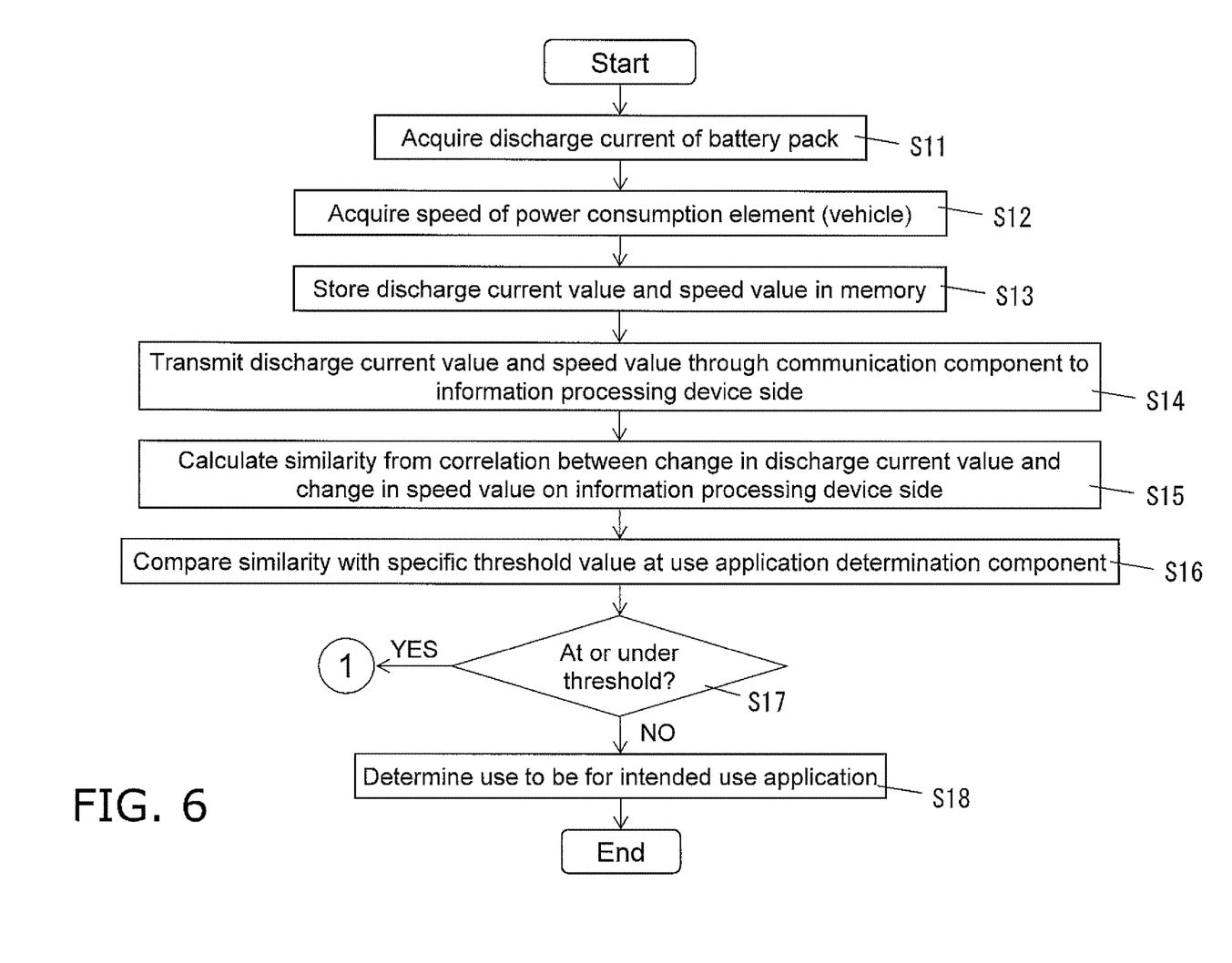
FIG. 6 is a flowchart of the flow of processing to detect usage for something other than the intended use application in a battery system including the battery pack in FIG. 1.
Figure 7:
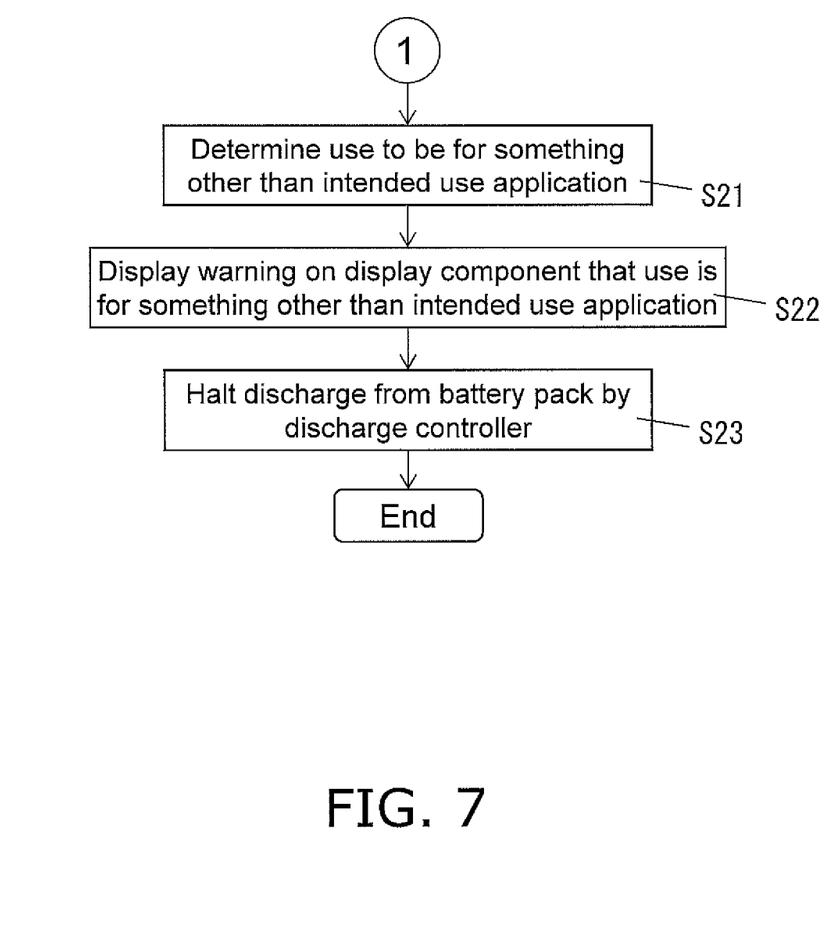
FIG. 7 is a flowchart of the flow of processing to detect usage for something other than the intended use application in a battery system including the battery pack in FIG. 1.

Method for Detecting Use of Battery Packs 10 for Something Other than Intended Use Application With the battery system 1 in this embodiment, the use of the battery packs 10 for something other than the intended use application is detected by the procedure shown in the flowchart in FIGS. 6 and 7.

Specifically, in step S11, the discharge current acquisition component 11 acquires the current value of the discharge current of the battery packs 10.

Next, in step S12, the status acquisition component 12 acquires the status change of the power consumption element in the period corresponding to the current value of the discharge current acquired in step S11 (change in the speed of the vehicle 30).

Next, in step S13, the current value of the discharge current acquired in steps S11 and S12 and the status of the power consumption element (the speed of the vehicle 30) in the period corresponding to the same are stored in the memory 13.

Next, in step S14, data including the speed of the vehicle 30 and the current value of the discharge current is sent via the communication component 14 to the information processing device 20 side.

Next, in step S15, the similarity calculator 22 on the information processing device 20 side compares the change in the discharge current value with the change in the speed of the vehicle 30, and calculates a degree of similarity indicating whether or not there is a correlation between the two.

Next, in step S16, the use application determination component 23 compares the similarity calculated in step S15 with a specific threshold value, and determines whether or not the battery packs 10 are being used for their intended use application (the vehicle 30).

Next, in step S17, it is determined whether or not the similarity is at or below a specific threshold value.

Here, if the similarity is over the specific threshold, the flow proceeds to step S18.

In step S18, as shown in the graph in FIG. 4, a change in the current value of the discharge current of the battery packs 10 is recognized as being correlated with a change in the travel speed of the vehicle 30, and it is determined that the battery packs are being used their intended use application.

On the other hand, if the similarity is at or below the specific threshold value, the flow proceeds to step S21 (see FIG. 7).

In step S21, as shown in the graph in FIG. 5, it is deemed that there is no correlation between the change in the current value of the discharge current of the battery packs 10 and the change in the status of the power consumption element, and it is determined that the use is for something other than the intended use application.

Next, in step S22, the display component 24 on the information processing device 20 side displays a warning that the battery packs 10 are being used for something other than their intended use application.

Consequently, the user of the battery packs 10 can be made to recognize that they are being used for something other than their intended use application, and can be prompted to discontinue their use.

How the warning is displayed on the display component 24 may be, for example, character information displayed on a display screen such as a liquid crystal display, or a red warning lamp may be lit or flashed, or the user may be alerted by some other means.

Next, in step S23, the discharge controller 15 halts the supply of power from the battery packs 10 on the basis of the determination result transmitted to the battery pack 10 side via the communication component 21 on the information processing device 20 side.

More specifically, the discharge controller 15 halts the supply of power to a power consumption element other than the intended use application upon receiving from the information processing device 20 side a determination result indicating that the use has been determined to be for something other than the intended use application.

Consequently, even if the user does not stop using the battery packs after being warned, it is possible to automatically stop the supply of power from the battery packs 10 to a power consumption element other than the intended use application.

As a result, by detecting the use of the battery packs 10 for something other than their intended use application, a decrease in the prediction accuracy of the service life of the battery packs 10 is prevented, and the original performance of the battery packs 10 can be ensured.

Embodiment 2

A battery pack 110 according to another embodiment of the present invention will now be described through reference to FIG. 8.

In Embodiment 1, use for something other than the intended use application is detected in the battery system 1 comprising the battery pack 10 having the discharge current acquisition component 11 and the status acquisition component 12, and the information processing device 20 having the similarity calculator 22 and the use application determination component 23.

Figure 8:
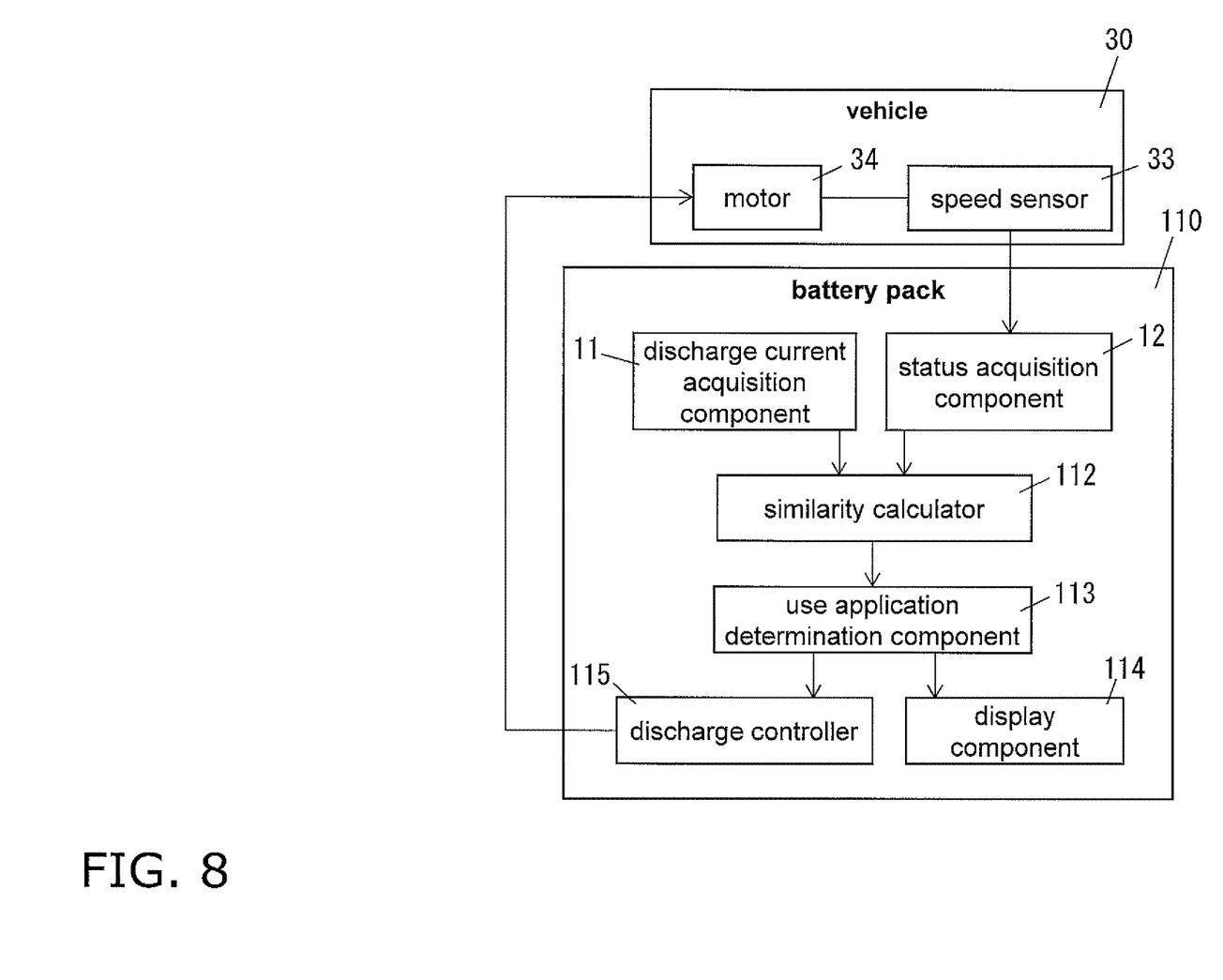
FIG. 8 is a block diagram of the configuration of the battery pack pertaining to another embodiment of the present invention.

On the other hand, in this embodiment, as shown in FIG. 8, the battery pack 110 comprises the discharge current acquisition component 11, the status acquisition component 12, a similarity calculator 112, and a use application determination component 113.

In other words, this embodiment differs from Embodiment 1 above in that the acquisition of the discharge current value, the acquisition of the status of the power consumption element (such as the speed of the vehicle), the calculation of the similarity, and the determination of whether or not the use is for something other than the intended use application (the vehicle 30) are performed by the battery pack 110.

Here again, since whether or not the use is for something other than the intended use application (the vehicle 30) can be determined on the battery pack 110 side, the same effect as above can be obtained.

Also, the battery pack 110 further comprises a display component 114, as shown in FIG. 8.

Consequently, when the use application determination component 113 determines that the battery pack is being used for something other than its intended use application (the vehicle 30), measures can take action such as displaying a warning to the user on the display component 114.

Furthermore, as shown in FIG. 8, the battery pack 110 further comprises a discharge controller 115.

Consequently, when the use application determination component 113 determines that the use is for something other than the intended use application (the vehicle 30), the discharge controller 115 can halt the supply of power to the power consumption element.

Also, the battery pack 110 in this embodiment may be provided with a communication component that communicates with a battery station.

In this case, a determination result indicating use for something other than the intended use application (the vehicle 30) can be transmitted to the battery station via the communication component, allowing measures to be taken, such as identifying the user who is using the battery pack 110 for something other than its intended use application, and issuing a warning.

Other Embodiments

Embodiments of the present invention were described above, but the present invention is not limited to or by the above embodiments, and various modifications are possible without departing from the gist of the invention.

(A)

In Embodiments 1 and 2 above, an example was given in which in the status acquisition component 12 acquired information about travel speed from the speed sensor 33 of the vehicle 30, and the degree of similarity was calculated by comparing this information to the discharge current from the battery packs 10, thereby determining whether or not the battery packs were being used for something other than their intended use application. However, the present invention is not limited to this.

For example, in addition to the travel speed of the vehicle, information acquired by the status acquisition component 12 may be the acceleration of the vehicle, the rotational speed of a motor or engine, the vibration or position of the power consumption element, or other such information.

Here again, the same effect can be obtained as the effect obtained in the above embodiments.

(B)

In Embodiments 1 and 2, an example was given in which the change in the travel speed of the vehicle 30 acquired by the status acquisition component 12 was compared to the change in the current value of the discharge current to detect use for something other than the intended use application. However, the present invention is not limited to this.

For example, if the intended use application is a vehicle, in addition to the travel speed, the change in acceleration, motor speed, position, or the like may be combined, and a determination may be made by comparing the change in two or more parameters with the change in the current value of the discharge current.

In this case, the determination of whether or not the use is for something other than the intended use application can be made more accurately by performing the determination using a plurality of parameters.

(C)

In Embodiment 2, an example was given in which, when use for something other than the intended use application is detected, measures are taken such as displaying a warning on the display component 114 of the battery pack 110, or halting the discharge with the discharge controller 115. However, the present invention is not limited to this.

For example, when use for something other than the intended use application is detected, this result is stored in the memory, and when the battery pack 110 is returned to the battery station or the like, the person in charge of the battery pack 110 may read out the memory to check whether there is a usage history for something other than the intended use application.

Here again, the person in charge of the battery pack 110 can take measures such as issuing a warning to the user who has used the battery pack 110 for something other than its intended use application, or assessing a fine.

(D)

In Embodiments 1 and 2, an example was given in which three battery packs were installed in an electric motorcycle (the vehicle 30) serving as the power consumption element. However, the present invention is not limited to this.

For example, one or two battery packs may be installed in the power consumption element, or four or more may be used.

Also, a plurality of battery pack mounting components may be provided on the power consumption element side, and a number of battery packs corresponding to the required electrical capacity may be installed.

(E)

In Embodiments 1 and 2, an example was given in which the battery pack 10 supplied power to an electric motorcycle, as the power consumption body (the vehicle 30). However, the present invention is not limited to this.

For example, in addition to an electric motorcycle, the present invention may also be applied to a battery pack for supplying power to some other vehicle, such as an electric unicycle, an electric bicycle, an electric automobile (EV), or a PHV (plug-in hybrid vehicle).

Alternatively, what the battery pack of the present invention is installed in is not limited to a vehicle, and may instead be some other electrical product driven by a replaceable battery.

For example, if the intended use application is a washing machine driven by a battery, the correlation between a change in the discharge current of the battery pack and a change in the speed of the motor of the washing machine may be confirmed. When the similarity indicating these two changes exceeds a specific threshold value, the use is determined to be for something other than the intended use application. On the other hand, if the similarity indicating these two changes is at or below the specific threshold, it is determined that the use is for the intended use application.

Consequently, it can be detected that the battery pack is used for something other than a washing machine, which is the intended use application, and measures can be taken such as warning the user or halting the discharge.

INDUSTRIAL APPLICABILITY

The effect of the battery pack of the present invention is that use for something other than the intended use application can be detected, so this invention can be widely applied to battery packs used in a variety of electrical products.

REFERENCE SIGNS LIST

1 battery system
10 battery pack
11 discharge current acquisition component (current acquisition component)
12 status acquisition component
13 memory (storage component)
14 communication component
15 discharge controller
20 information processing device
21 communication component
22 similarity calculator
23 use application determination component
24 display component
30 vehicle
30a seat
30b handle bar
31 front wheel
32 rear wheel (drive wheel)
33 speed sensor
34 motor 110 battery pack
112 similarity calculator
113 use application determination component
114 display component
115 discharge controller
S step

The invention claimed is:

1. A battery pack that supplies power to a power consumption element, comprising:
   a current acquisition component configured to acquire a current value of a discharge current supplied to the power consumption element;
   a status acquisition component configured to acquire a status of the power consumption element operating under the current value acquired by the current acquisition component;
   a similarity calculator configured to compare the current value acquired by the current acquisition component with the status of the power consumption element acquired by the status acquisition component, and calculate the similarity between the two; and
   a use application determination component configured to determine whether or not the battery pack is being used for its intended use application according to the similarity calculated by the similarity calculator component.

2. The battery pack according to claim 1,
   wherein the use application determination component determines that there is an error or the battery pack is being used for something other than its intended use application when the status acquisition component could not acquire a change in the status of the power consumption element.

3. The battery pack according claim 1,
   wherein the status acquisition component acquires information that includes at least one of a speed, vibration, motor speed, acceleration, and position of the power consumption element.

4. The battery pack according to claim 1,
   wherein the similarity calculator calculates the similarity after comparing the change in the current value acquired by the current acquisition component with the change in the speed, vibration, motor speed, acceleration, and position of the power consumption element acquired by the status acquisition component.

5. The battery pack according to claim 1,
   wherein the use application determination component determines that the battery pack is being used for something other than its intended use application when the similarity calculated by the similarity calculator is below a specific threshold.

6. The battery pack according to claim 1, further comprising
   a display component configured to display a warning to the user when the use application determination component determines that the battery pack is being used for something other than its intended use application, on the basis of the calculation result by the similarity calculator.

7. The battery pack according to claim 1, further comprising
   a discharge controller configured to halt discharge to the power consumption element when the use application determination component determines that the battery pack is being used for something other than the intended use application, on the basis of the calculation result by the similarity calculator.

8. The battery pack according to claim 1,
   wherein the power consumption element is a vehicle, including an electric motorcycle, an electric bicycle, and an electrically assisted bicycle.

9. A battery system, comprising:
   a battery pack having a current acquisition component configured to acquire a current value of a discharge current supplied to a power consumption element, and a status acquisition component configured to acquire a status of the power consumption element operating under the current value acquired by the current acquisition component; and
   an information processing device having a similarity calculator configured to compare the current value acquired by the current acquisition component with the status of the power consumption element acquired by the status acquisition component, and calculate the similarity between the two, and a use application determination component configured to determine whether or not the battery pack is being used for its intended use application according to the similarity calculated by the similarity calculator component.

10. The battery system according to claim 9,
    wherein the use application determination component determines that there is an error or the battery pack is being used for something other than its intended use application when the status acquisition component could not acquire a change in the status of the power consumption element.

11. The battery system according to claim 9,
    wherein the status acquisition component acquires information that includes at least one of a speed, vibration, motor speed, acceleration, and position of the power consumption element.

12. The battery system according to claim 9,
    wherein the similarity calculator calculates the similarity after comparing the change in the current value acquired by the current acquisition component with the change in the speed, vibration, motor speed, acceleration, and position of the power consumption element acquired by the status acquisition component.

13. The battery system according to claim 9,
    wherein the use application determination component determines that the battery pack is being used for something other than its intended use application when the similarity calculated by the similarity calculator is below a specific threshold.

14. The battery system according to claim 9,
    wherein the information processing device further has a display component configured to display a warning to the user when the use application determination component determines that the battery pack is being used for something other than the intended use application on the basis of the calculation result by the similarity calculator.

15. The battery system according to claim 9, further comprising
    a discharge controller configured to halt discharge to the power consumption element when the use application determination component determines that the battery pack is being used for something other than the intended use application on the basis of the calculation result by the similarity calculator.

16. The battery system according to claim 9,
    wherein the power consumption element is a vehicle, including an electric motorcycle, an electric bicycle, and an electrically assisted bicycle.

17. A method for distinguishing a use application of a battery pack, comprising:
- a current acquisition step of acquiring a current value of a discharge current supplied to a power consumption element;
- a status acquisition step of acquiring a status of the power consumption element operating under the current value acquired in the current acquisition step;
- a similarity calculation step of comparing the current value acquired in the current acquisition step with the status of the power consumption element acquired in the status acquisition step, and calculating similarity between the two; and
- a use application determination step of determining whether or not the battery pack is being used for the intended use application according to the similarity calculated in the similarity calculation step.

\* \* \* \* \*